United States Patent
Mildner et al.

(10) Patent No.: US 9,156,501 B2
(45) Date of Patent: Oct. 13, 2015

(54) MOTOR VEHICLE BODY WITH AN EXTERNAL REINFORCING ELEMENT FOR THE REAR AXLE CONNECTION

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 77 days.

(21) Appl. No.: 13/938,985

(22) Filed: Jul. 10, 2013

(65) Prior Publication Data

US 2014/0015284 A1 Jan. 16, 2014

(30) Foreign Application Priority Data

Jul. 11, 2012 (DE) .......................... 10 2012 013 784

(51) Int. Cl.
*B62D 25/08* (2006.01)
*B62D 21/11* (2006.01)
*B62D 25/20* (2006.01)

(52) U.S. Cl.
CPC ................ *B62D 25/08* (2013.01); *B62D 21/11* (2013.01); *B62D 25/088* (2013.01); *B62D 25/2027* (2013.01); *B60G 2204/1432* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,887,862 A * | 12/1989 | Bassi | ............................ | 296/204 |
| 5,364,128 A * | 11/1994 | Ide | ................ | 280/784 |
| 5,556,133 A * | 9/1996 | Oku et al. | ..................... | 280/781 |
| 6,296,418 B1 | 10/2001 | Birkwald et al. | | |
| 6,494,472 B2 * | 12/2002 | Suzuki | .................. | 280/124.109 |
| 7,040,639 B2 | 5/2006 | Tamura | | |
| 7,520,514 B2 * | 4/2009 | Ogawa et al. | .......... | 280/124.109 |
| 7,891,683 B2 * | 2/2011 | Bitz et al. | ............... | 280/124.128 |
| 7,946,377 B2 * | 5/2011 | Frasch et al. | ................... | 180/312 |
| 7,997,618 B2 * | 8/2011 | Hartmann et al. | ............ | 280/785 |
| 8,286,980 B2 * | 10/2012 | Onda et al. | ............. | 280/124.128 |
| 8,662,574 B2 * | 3/2014 | Mildner et al. | ............... | 296/204 |
| 8,720,919 B2 * | 5/2014 | Takahashi et al. | ..... | 280/124.109 |
| 8,870,274 B2 * | 10/2014 | Mildner | .................. | 296/203.04 |
| 8,925,947 B2 * | 1/2015 | Schmitz et al. | ........ | 280/124.166 |
| 2005/0140112 A1 * | 6/2005 | Kim | ....................... | 280/124.143 |

(Continued)

FOREIGN PATENT DOCUMENTS

| | | | | |
|---|---|---|---|---|
| DE | 3441560 A1 * | 5/1986 | ............... | B60G 7/00 |
| DE | 102010023073 A1 | 12/2011 | | |
| FR | 2924672 A3 * | 6/2009 | ............. | B62D 21/11 |

OTHER PUBLICATIONS

German Patent Office, German Search Report for Application No. 102012013784.2, dated Jan. 9, 2013.

*Primary Examiner* — Nicole Verley
(74) *Attorney, Agent, or Firm* — Ingrassia Fisher & Lorenz PC (57) ABSTRACT

A motor vehicle body is provided with at least one rear-end side member, on the lower side of which a reinforcing element for the connection of a rear axle arrangement is arranged. The reinforcing element includes, but is not limited to a connecting portion spaced from the side member with at least one through-opening for mounting an axle fastening element. The connecting portion supports itself on the side member via at least one support element penetrating the intermediate space between side member and connecting portion.

15 Claims, 8 Drawing Sheets

(56) References Cited

U.S. PATENT DOCUMENTS

| | | |
|---|---|---|
| 2006/0118373 A1 | 6/2006 | Birkwald et al. |
| 2007/0024044 A1* | 2/2007 | Ogawa et al. .............. 280/788 |
| 2012/0211962 A1* | 8/2012 | Schmitz et al. ........ 280/124.128 |
| 2014/0252805 A1* | 9/2014 | Grosse et al. ............ 296/193.07 |
| 2014/0312654 A1* | 10/2014 | Komiya et al. ........... 296/187.09 |
| 2015/0021952 A1* | 1/2015 | Mildner et al. ........... 296/187.08 |

* cited by examiner

MOTOR VEHICLE BODY WITH AN EXTERNAL REINFORCING ELEMENT FOR THE REAR AXLE CONNECTION

CROSS-REFERENCE TO RELATED APPLICATION

This application claims priority to German Patent Application No. 10 2012 013 784.2, filed Jul. 11, 2012, which is incorporated herein by reference in its entirety.

TECHNICAL FIELD

The technical field relates to a body of a motor vehicle with rear-end or rear side members, on which at least one reinforcing element for the connection of a rear axle arrangement is provided.

BACKGROUND

Popular rear axles, such as for example twist beam axles or multi-link axles of motor vehicles comprise at least one control arm, which is to be arranged on the rear side member or on a rear frame structure of a motor vehicle body via an axle bearing. The connecting region provided for the fastening of the control arm, for example a side member, typically is to be structurally reinforced so that the mechanical forces that occur during the operation of the motor vehicle and can be transferred into the support structure of the motor vehicle via the control arm can be absorbed without problems and discharged into the support structure of the motor vehicle, i.e., into the self-supporting motor vehicle body.

The axle connection furthermore takes place in the region of a wheel housing provided for the respective rear wheel. In this region, a side member structure of the motor vehicle body is usually subject to an offset in height with respect to the vehicle vertical axis (z). A rear region of the side member facing the vehicle rear in this case is typically located slightly higher than a side member portion located in travelling direction in front of the rear axle. Furthermore, there is the requirement for example in passenger cars, to guide a tank filler pipe for example below the side member from a vehicle outer side to a vehicle inner side. If the tank filler pipe is to be installed for example in the region of the control arm, it must be ensured that a moveably mounted control arm does not collide with the tank filler pipe even in a maximally bumped end state.

Thus, a vehicle body with side members is known for example from DE 10 2009 043 913 A1, which comprise means for mounting a fastener of a twist beam axle and a multi-link axle. For the multi-link axle, means for mounting the multi-link axle are provided on the side members in the form of a bracket in this case.

In view of the foregoing, at least one object is to provide a motor vehicle body with a structurally reinforced rear axle connection that is improved with respect to its stability and optimized with respect to the motor vehicle installation space distribution. In addition, other objects, desirable features and characteristics will become apparent from the subsequent summary and detailed description, and the appended claims, taken in conjunction with the accompanying drawings and this background.

SUMMARY

In this regard, a motor vehicle body is provided, which comprises at least one rear-end side member. Here, a reinforcing element for the connection of a rear axle arrangement is arranged on the lower side of the side member. Here, the reinforcing element comprises a connecting portion spaced from the side member for the rear axle arrangement, wherein the connecting portion comprises at least one through-opening for mounting an axle fastening element. Furthermore, the connecting portion supports itself on the side member via at least one support element penetrating the intermediate space between side member and connecting portion.

The support element in this case is completely located in the intermediate or hollow space formed by connecting portion and side member. In addition to a preferably marginal connection of the reinforcing element on the side member, its connecting portion of the reinforcing element spaced from the side member supports itself on the side member via at least one, for example additional support element. Here, the reinforcing element constitutes far more than only a bracket for mounting an axle connecting element. In that the reinforcing element specifically supports itself on the side member via at least one support element provided separately for this purpose, a structural reinforcement of the axle connection can take place especially in the region of the axle fastening element provided for the axle connection.

Typically, the axle fastening element is formed as a screw bolt with an axle connecting portion on the rear axle side can be screwed to the connecting portion of the reinforcing element or to the side member. Since the connecting portion of the reinforcing element however is spaced from the side member so that between axle connecting portion and side member a hollow space is obtained, a possible deformation of the connecting portion of the reinforcing element during the screwing-on of the axle arrangement can be counteracted with the support element extending between connecting portion and side member. Through the additional support, the reinforcing element structurally reinforcing the axle connection in this regard can be produced from a comparatively thin-walled material so that in the end the vehicle weight can be reduced.

The reinforcing element arranged on the lower side of the side member and its connecting portion for the rear axle arrangement comes to lie underneath the side member, the connecting portion for the rear axle arrangement on the body side can be located slightly lower on the vehicle vertical side (z), so that for example a tank filler pipe can be installed in the intermediate space between control arm and side member in vehicle transverse direction (y) below the side member without problems.

According to an embodiment, the support element of the reinforcing element is formed as a sleeve enclosing the through-opening. Here, it can be provided in particular that the spacing element is formed unitarily with the axle connecting portion of the reinforcing element. The support element can furthermore be molded onto the connecting portion of the reinforcing element, deep-drawn or formed through stamping of the connecting portion.

According to an embodiment, however it is alternatively also conceivable that the support element is produced as a separate component and arranged on the connecting portion of the reinforcing element. Here, a non-releasable arrangement, respectively fastening of the support element on the connecting portion is advantageous. It can be provided in particular that the support element and the connecting portion are welded together or otherwise interconnected through a materially joined connection.

According to an embodiment, at least one fastening element that comes to lie in an aligned manner with the through-opening or with the support element of the reinforcing element is provided on the side member, which interacts with the axle fastening element. For example, the axle fastening element can be formed as a screw bolt and the fastening element provided on the side member, as a welding nut. In this regard, the fastening element provided on the side member can be welded onto the side member in a pre-configured manner.

Through the fastening element provided on the side member and interacting with the axle fastening element and through the support element typically mounting the axle fastening element or being penetrated thereby, a particularly stable and torsionally rigid mutual fastening of rear axle arrangement and side member can take place. In particular, a conceivable deformation and a possible weakening of the connecting portion of the reinforcing element that may be accompanied by this can be counteracted through the support element.

The hollow space between the connecting portion of the reinforcing element and the side member can be stabilized and suitably bridged with the support element. The axle fastening element in this regard can be connected to the fastening element provided on the side member side with an extremely high tightening torque. Here it is even conceivable that the reinforcing element by way of the support element mounting the axle fastening element and through the fastening of the axle fastening element with the fastening element provided on the side member side is fixed and fastened to the side member, in a manner of speaking clamped in between an axle connecting element provided on an axle side and the side member. In this regard, the reinforcing element could act purely as a spacer between axle connecting element of the rear axle arrangement and the side member. Since the reinforcing element typically comprises a plurality of through-openings each provided with support elements for mounting an axle fastening element, a multiple and thus adequately stable supporting of the reinforcing element on the side member could take place here without the necessity of separately fastening the reinforcing element to the side member.

According to other configurations it is provided, however, to separately fasten the reinforcing element to the side member prior to an axle assembly. For this purpose, the reinforcing element can comprise at least one marginal fastening flange with which it can be fastened for example to the side member or to further load-bearing structural components of the motor vehicle body. In the region of one or of a plurality of marginal flange portions, the reinforcing element can be welded to the side member or non-releasably fastened with other joining methods, such as for example with of penetration joining or by means of gluing.

Through the multiple connections or supporting of the reinforcing element on the side member the forces introduced into the body from the axle arrangement can be more evenly discharged into the side member or into further body components adjoining the reinforcing element via the reinforcing element. A mechanical load path can in this case extend in particular over the support elements located in the intermediate space between connecting portion of the reinforcing element and side member.

Independently of the configuration of the support element or support elements, it can be provided according to a further embodiment that the connecting portion comprises at least one trough-like depression extending towards the side member for mounting an axle bearing. Such a depression can be advantageous for reasons of installation space optimization or division of space.

In a further embodiment, the reinforcing element can support itself with at least one marginal flange portion furthermore on the side member and/or on at least one further support structure component. Here it is advantageous in particular when the reinforcing element with it's at least one flange portion coming to directly bear against the side member is structurally connected to the latter.

According to a further embodiment, the at least one support element comprises at least one support flange on its end facing away from the connecting portion or facing the side member typically coming to bear directly against the side member. With a preferably surrounding formed support flange, concentrated loads as a result of a force introduction or force transmission can be advantageously reduced. Furthermore, the effective support area between support element and side member can be advantageously enlarged.

In a further preferred configuration, the side member is formed substantially linearly and/or substantially without kinks in a connecting region of the reinforcing element. By way of the reinforcing element which can be arranged on the side member from the outside and from below it can namely be achieved in particular that the axle connecting portion of the reinforcing element provided for mounting an axle connecting element on the axle side extends another angle than the course of the side member provided there. Thus, in particular with the reinforcing element that can be arranged on the side member from below and from the outside, a geometrical adaptation on the body side or side member side for an axle fastening can be provided without having to change the course of the at least one half shell of the side member on a floor side.

A linear course, in particular a course that is largely free of kinks of at least one lower half shell of the side member on the floor side is advantageous with respect to the stability and the maximum load absorption of the side member. A side member formed without kinks tends towards far fewer uncontrolled deformations when mechanical loads occur. Such a course under certain conditions even makes possible a reduction of the sheet metal thickness of the side member so that in the end the weight of the side member and thereby of the entire motor vehicle can be advantageously reduced.

According to a further embodiment, the side member in the connecting region of the reinforcing element also comprises an indentation corresponding to the trough-like depression of the reinforcing element or a trough-like depression which is directly comparable to this. In this regard, the side member at least in regions can also be adapted to the geometrical configuration of the reinforcing element.

Independently of whether the side member has such an indentation, the reinforcing element according to a further preferred configuration can also be structurally connected to the side member via its trough-like depression, in particular welded to said side member. The connection of the trough-like depression of the reinforcing element to the side member and a structural connection of a marginal flange portion of the reinforcing element to the side member, offers a multiple structural connection of the reinforcing element to the side member, so that altogether a particularly torsionally rigid and mechanically stable mutual connection of reinforcing element and side member can be achieved.

According to a further embodiment, an additional reinforcing element is arranged on the reinforcing element between reinforcing element and side member, which supports itself at least one a support element of the reinforcing element, or which comes to bear against this in a supporting manner. The additional reinforcing element in this case can be used in particular for connecting a multi-link axle, in particular when the region provided on the side member side for connecting the reinforcing element has a particularly large height offset or when the reinforcing element because of the geometrical requirements of the axle connection has a particularly large trough-like shaping or curvature.

In such cases, a clear spacing between the connecting portion of the reinforcing element and the lower side of the side member can become so large that popular axle fastening elements can no longer be used. In order to be able to use standardized axle fastening elements in cases configured such, the additional reinforcing element in the intermediate space between reinforcing element and side member can be inserted.

Advantageously, the fastener, for example welding nuts, which otherwise have to be provided on the inside of a lower shell of the side member in this case, are provided on the side of the additional reinforcing element facing away from the connecting portion of the reinforcing element. The rear axle arrangement in this case can be fastened to the body in the conventional way making use of axle fastening elements which remain the same or which are standardized.

According to a further embodiment, a motor vehicle is finally provided which comprises a previously described motor vehicle body.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
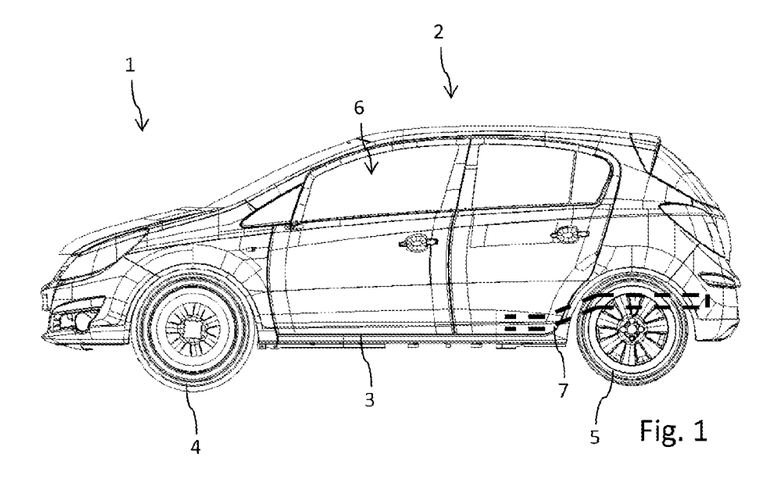
FIG. 1 is a schematic lateral view of a motor vehicle.

FIG. 1 shows a motor vehicle 1 in a schematic representation. This comprises a motor vehicle body 2 with a passenger cell 6 extending approximately between a front wheel 4 and a rear wheel 5. On the floor side, i.e., below the passenger cell 6, the motor vehicle body 2 comprises a sill structure 3, which in the region of the rear wheel 5 merges into a side member 7, which in FIG. 1 is merely shown in interrupted lines.

Figure 2:
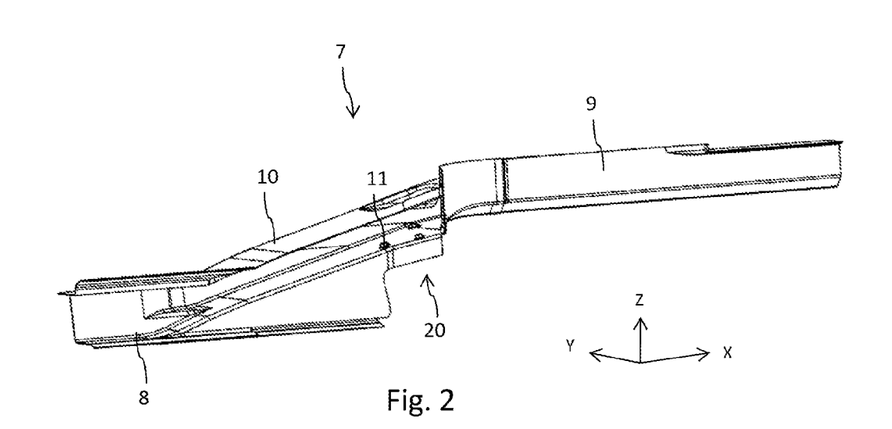
FIG. 2 is a perspective representation of a side member.
Figure 13:
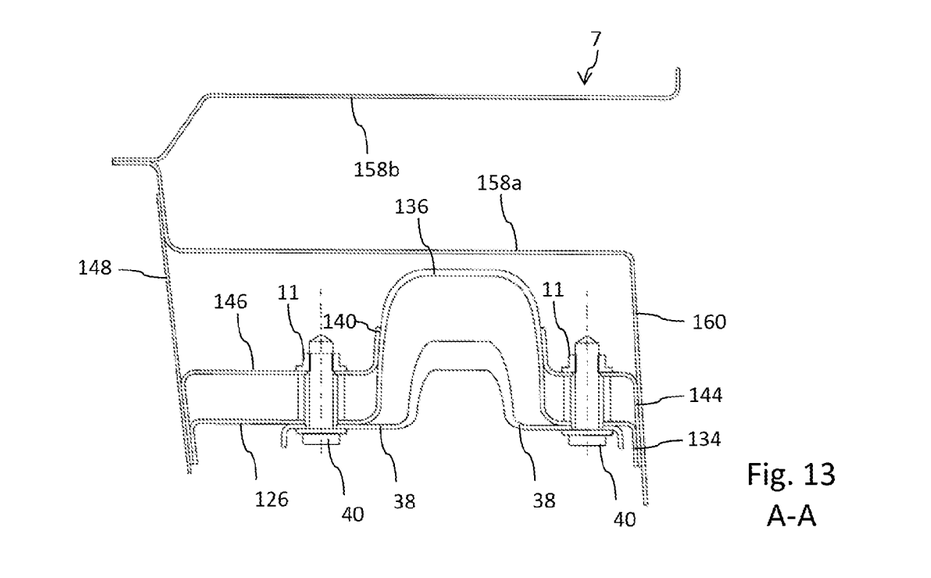
FIG. 13 is a cross section A-A according to FIG. 12.

The side member 7 is shown isolated in FIG. 2. It comprises a front side member portion 8 and a rear side member 9, wherein front and rear side member portion 8, 9 each comprise two half shells corresponding to one another and designed for forming a closed side member profile, which in FIG. 13 are marked for example 158A and 158b. FIG. 2 for example also shows the closing plate 10 of the front side member portion 8. Front side member portion 8 and rear side member portion 9 are arranged at a different height level with respect to the vehicle vertical axis (z). Thus, the rear side member portion 9 is located slightly higher than the front side member portion 8.

Figure 3:
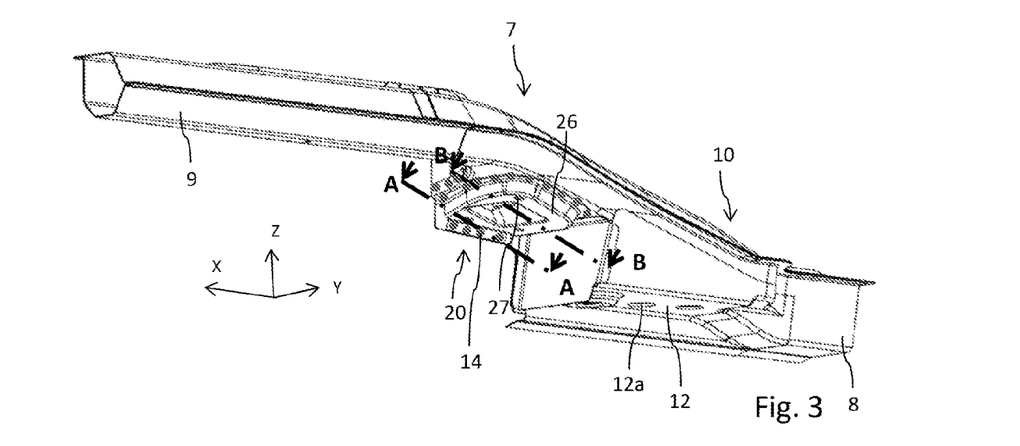
FIG. 3 is a further perspective representation of the side member according to FIG. 2 viewed obliquely from below.
Figure 4:
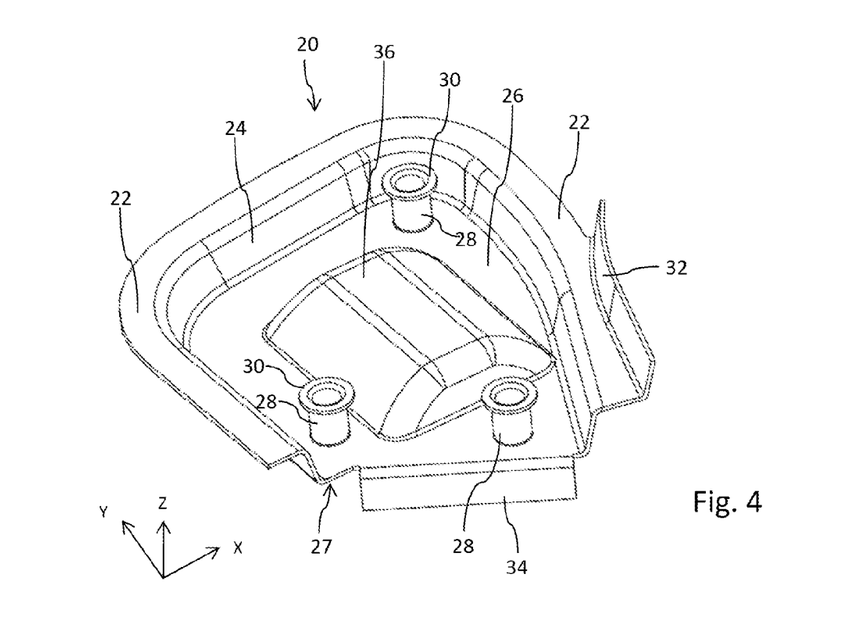
FIG. 4 is a perspective and isolated representation of a reinforcing element that can be arranged on the lower side of the side member.
Figure 5:
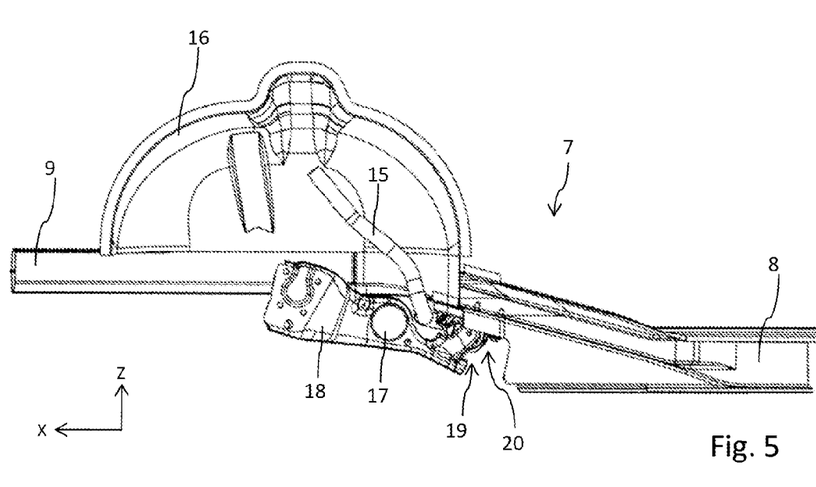
FIG. 5 is a lateral view of the side member with a control arm arranged thereon.

In a transition region between front and rear side member portion 8, 9, a reinforcing element 20 for the connection of a rear axle arrangement is finally shown in installation position in FIG. 3 and in an isolated manner in FIG. 4. The reinforcing element 20 in the configuration according to FIG. 2 to FIG. 7 comprises a connecting portion 26 formed approximately flat, which at least in regions is enclosed by a marginal portion 24 rising from the plane of the connecting portion 26. The marginal portion 24 extending approximately parallel to the vehicle vertical axis (z) furthermore merges into an almost surrounding marginal flange portion 22, which extends approximately parallel to the plane of the connecting portion 26. With the almost surrounding marginal flange portion 22, the reinforcing element 20 is connected to the lower side of the side member 7, preferably welded to the latter.

The reinforcing element 20 furthermore comprises further flange portions 32, 34, with which the reinforcing element 20 can be connected to further body components directly adjoining thereon, in particular welded to these. Corresponding spot welds 14 are schematically indicated in the perspective representation according to FIG. 3.

Figure 6:
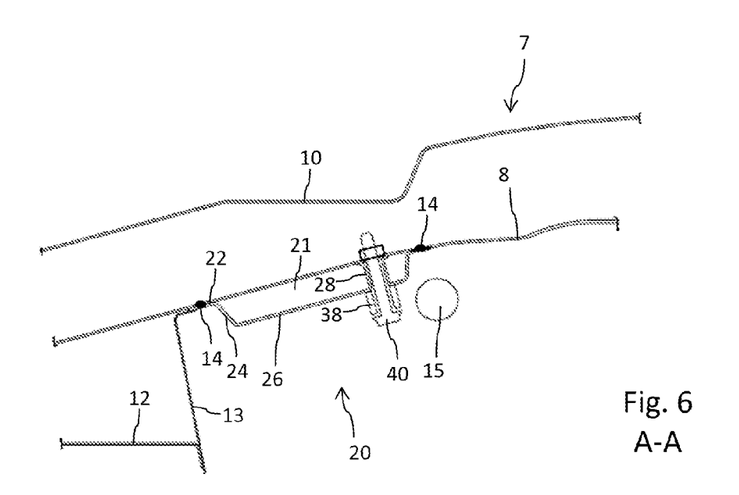
FIG. 6 is a cross section A-A according to FIG. 3.

The connecting portion 26 of the reinforcing element 20 furthermore comprises three through-openings 27 merely indicated in FIG. 3, and identified through support elements 28 in FIG. 4, which serve for mounting an axle fastening element 40, which in the cross-sectional representation according to FIG. 6 is embodied as a screw bolt. Round about the through-openings 27 of the connecting portion 26, individual support elements 28 formed sleeve-like are provided by which the reinforcing element 20 can additionally support itself on the lower side of the side member 7, as is made visible for example in FIG. 6. The support elements 28 in this case penetrate an intermediate space 21 formed by connecting portion 26 and side member 7, i.e., they are completely arranged in the intermediate space 21.

The individual support elements 28 formed sleeve-like to this end comprise a surrounding support flange 30 at their end portion facing away from the connecting portion 26 and facing the beholder in FIG. 4. As is evident from FIGS. 2 and 6, the side member 7 in the connecting region for the reinforcing element 20 comprises individual fastening elements 11 in the form of welding nuts. These are naturally provided aligned with a through-opening provided in the sheet metal of the side member 7 and not explicitly shown in the figures.

As is shown furthermore in FIG. 6, an axle connecting element 38 on the axle side can come to bear against the connecting portion 26 of the reinforcing element 20 by means of the axle fastening element 40 and be screwed to the axle fastening element. The screwing location in this case is reinforced through the support element 28, so that the forces introduced from the rear axle arrangement into the reinforcing element 20 can be introduced or discharged into the side member 7 both via the connecting portion 26 and its marginal flange portions 22, 34, 32 as well as directly also via the support element 28 that comes to bear against the side member 7 on the outside and on the lower side.

Figure 8:
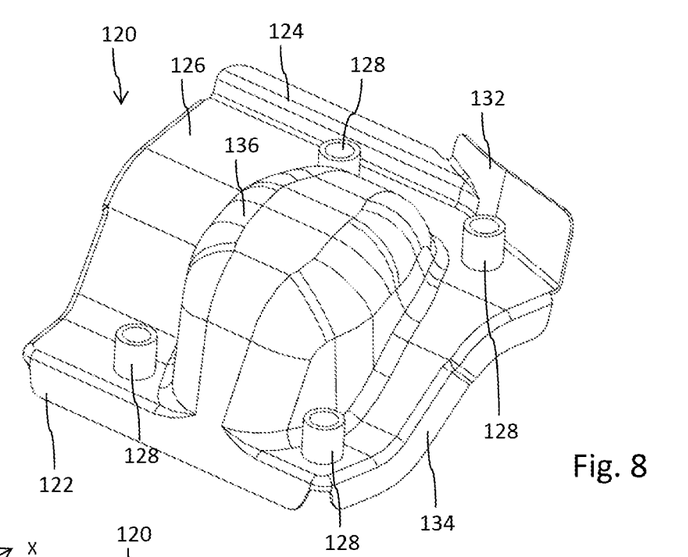
FIG. 8 is an alternative embodiment of a reinforcing element in a perspective representation.
Figure 9:
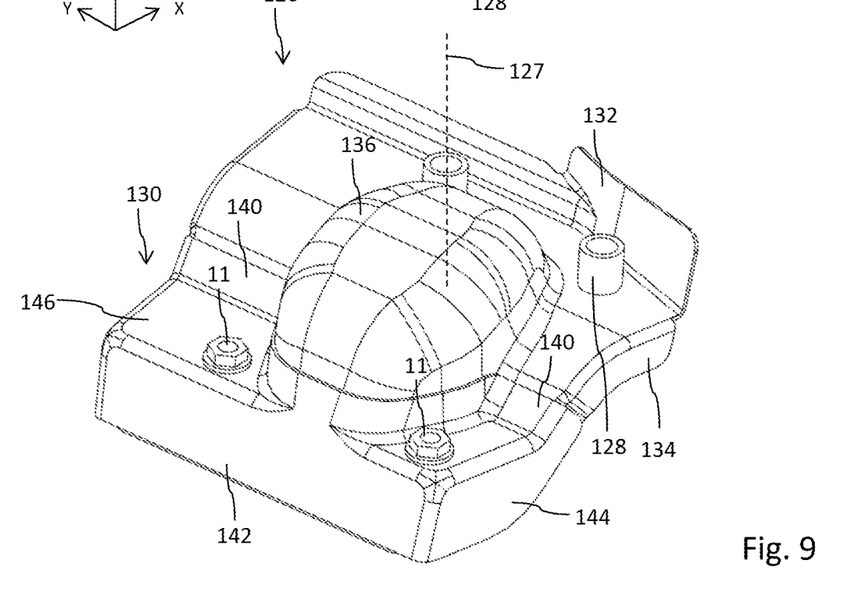
FIG. 9 is the reinforcing element according to FIG. 8 with an additional reinforcing element fastened thereon.

In this regard, a multiple structural connection and mechanical support of the reinforcing element, thus of the axle connection to the side member, can take place by way of the support element 28. Furthermore, it can be achieved with the reinforcing element 20 to be arranged on the lower side of the side member 7 that the position of the axle connection, based on the vehicle vertical axis (z), can be offset slightly downwards. This can prove to be particularly advantageous for accommodating a tank filler pipe 15. Thus, a control arm 18 of a twist beam axle with a torsion tube 17 that is pivotally mounted on the side member 7 via an axle bearing 19 shown in FIG. 5 next to a wheel housing 16. In that the reinforcing element 20 is built up on the side member 7 directed downwards, the corresponding connecting point for the control arm 18 can be likewise relocated slightly further downwards to that even with maximally bumped control arm 18, as shown in FIG. 8, a collision with a tank filler pipe 15 that is to be guided passed below the side member 7 can be avoided.

Figure 7:
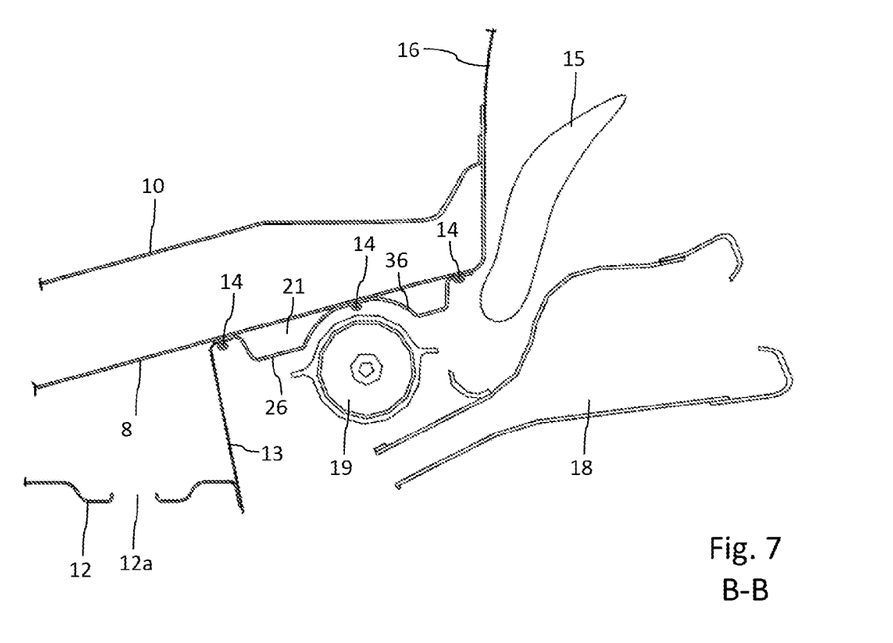
FIG. 7 is a cross section B-B according FIG. 3.

From the two cross sections A-A and B-B according to FIG. 6 and FIG. 7 it is evident, furthermore, that at least the lower side of the side member 7 or the front side member portion 8 in the region of the connection of the reinforcing element 20 can be largely formed free of kinks. In the two cross sections, a connecting plate 13 is additionally shown, which extends from a front marginal or flange portion 22 of the reinforcing element 20 downwards and which with its end facing away from the front side member portion 8 is connected to a mounting plate 12 that is substantially aligned horizontally and substantially extends in vehicle longitudinal direction (x).

The mounting plate 12, as illustrated in FIG. 3 and FIG. 7, comprises individual mounting holes 12a or main mounting holes, by which the body 2 during the manufacturing process of the motor vehicle can be mounted and moved in a defined manner in holders provided for this purpose.

In FIG. 4 and FIG. 7, a trough-like depression 36 of the connecting portion 26 is shown furthermore, which serves for the geometrical adaptation of the axle bearing 19 and quasi forms a mounting depression for the latter. As is indicated in FIG. 7, the trough-like depression 36 projecting upwards to the lower side of the front side member portion 8 can be separately connected to the side member portion 8, in particular welded thereto. In this regard, the structural connection and fastening of the reinforcing element 20 on the side member 7 can be further improved. While the configuration according to FIG. 1 to FIG. 7 is primarily provided for the connection of a twist beam axle, the configuration according to FIG. 8 to FIG. 14 in particular serves for a multi-link axle connection.

The reinforcing element 120 shown in an isolated manner in FIG. 8 comprises a sweepingly formed connecting portion 126 with a trough-like depression 136. Here, outside the trough-like depression 136, a plurality of support elements 128 each formed sleeve-like is also provided, in this case four individual such support elements 128 spaced from one another. These are arranged aligned with through-openings 127 of the connecting portion 126 that are not explicitly shown but which are evident from the cross section of FIG. 13. In this regard, the support elements 128 also serve for mounting for example an axle fastening element 40 formed as a screw-bolt shown in FIG. 13. The reinforcing element 120 also comprises individual marginal flange portions 122, 124, 132, 134, by means of which the reinforcing element 120 can be fastened, in particular welded to adjoining body components.

In contrast with the configuration according to FIG. 2 to FIG. 7, not all support elements 128, but merely the two support elements 128 facing the vehicle rear however can be brought to bear against the lower side of the side member 7 in a supporting manner near the flange portions 124, 120, 132. The two support elements 128 located in front in FIG. 8 in this case serve for supporting an additional reinforcing element 130 shown in FIG. 9, which with respect to its shaping and contour is adapted to the reinforcing element 120. Thus, the additional reinforcing element 130 comprises a base portion 146, by which the additional reinforcing element 130 supports itself on the two support elements 128. The base portion 146 in this case is provided with two fastening elements 11 corresponding to the support elements 128 with respect to their position, for example in the form of welding nuts.

Otherwise, the additional reinforcing element 130 comprises marginal flange portions 140, 142, 144 adapted to the contour of the reinforcing element 120, which largely come to bear flat against the connecting portion 126 located below and the marginal flange portions 122, 134 of the reinforcing element 120 and can be preferably welded or otherwise connected to these. The two perspective representations according to FIG. 10 and FIG. 11 show the assembly of the reinforcing element 120 shown in FIG. 9 and preassembled with the additional reinforcing element 130 with the mounting plate 12 already mentioned before and with a connecting plate 148 adjoining towards the vehicle inner side.

Figure 10:
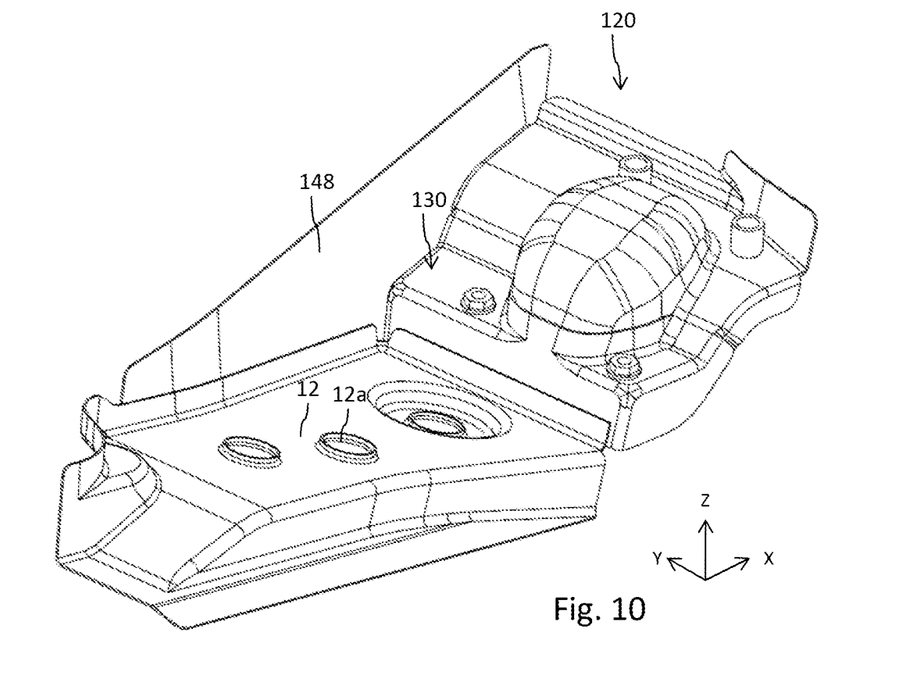
FIG. 10 is the reinforcing element according to FIG. 9 with further body components that come to bear against said reinforcing element.
Figure 11:
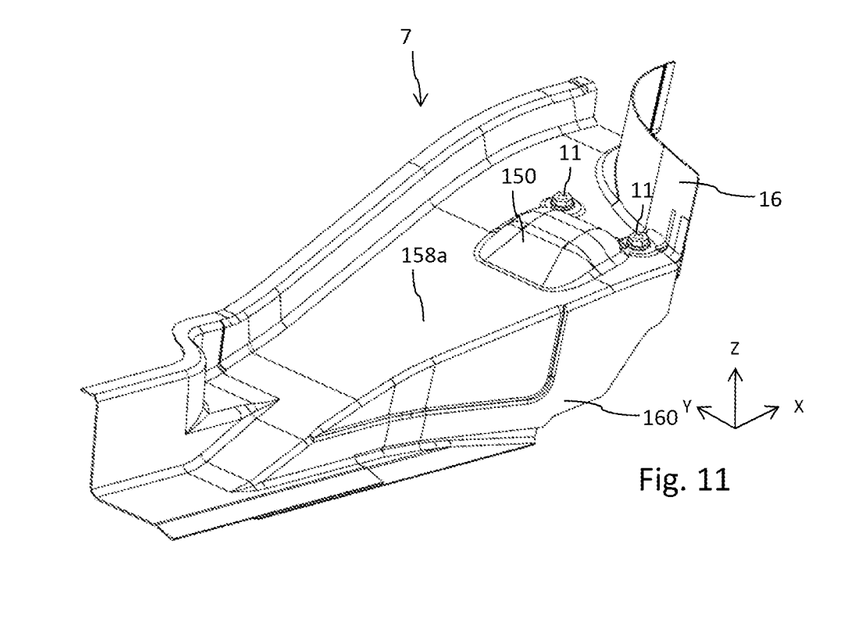
FIG. 11 is a side member connected to the reinforcing component according to FIG. 8 and FIG. 9.

FIG. 11 shows an assembly configuration, in which merely a lower shell 158a of the side member 7 is placed onto the assembly according to FIG. 10. The side member 7 or its lower sheet metal shell 158a in this case likewise has an indentation 150 facing upwards towards the beholder which corresponds to the shaping of the trough-like depression 136 of the reinforcing element 120. Furthermore, two further fastening elements 11 formed in the form of welded nuts are shown in the representation according to FIG. 11, which come to bear with the rear support elements 128 located below. The lower shell 158a of the side member 7 furthermore comprises a lateral cheek 160 extending approximately in the plane formed by vehicle longitudinal axis (x) and vehicle vertical axis (z). The wheel housing 16 is also already shown to some extent in FIG. 11, which is adjoined by the side member 7.

Figure 12:
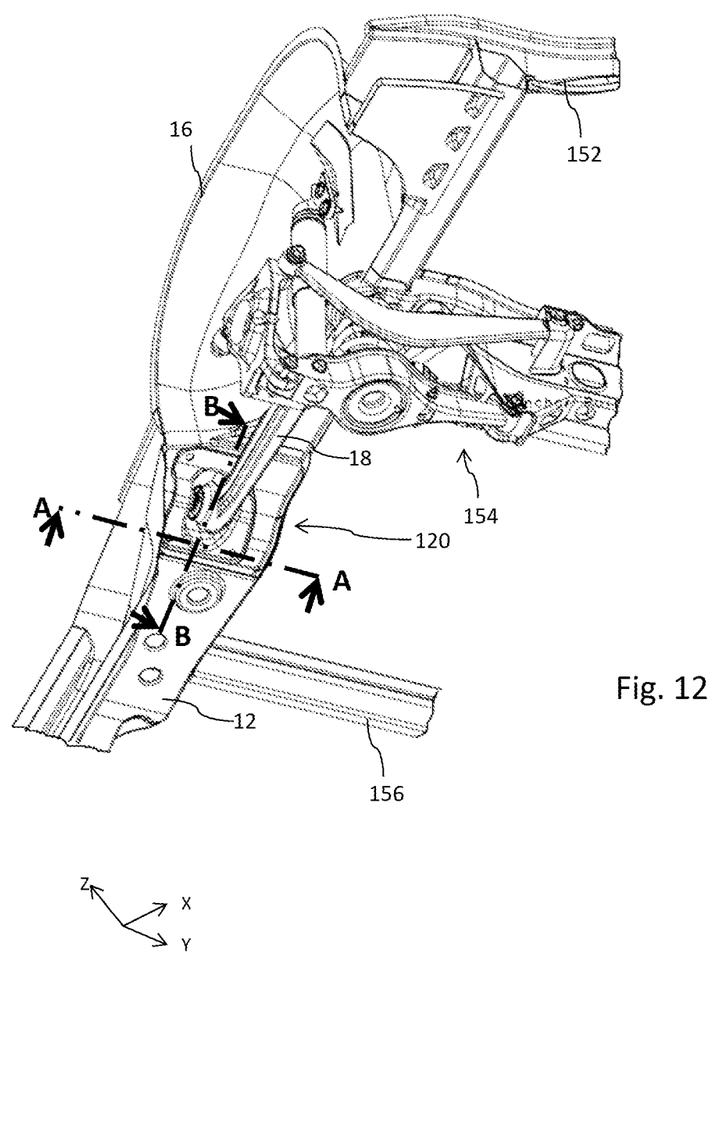
FIG. 12 is a view of the side member according to FIG. 11 viewed from below together with a multi-link axle arrangement arranged thereon.

As is shown furthermore in the perspective representation according to FIG. 12, the reinforcing element 120, in particular with its trough-like depression 136, is formed for mounting a bearing 19 of a control arm 18 of a multi-link axle arrangement 154. In addition, two cross members 156, 152 are shown in FIG. 12, by which the side member 7 shown there is connected to a side member formed mirror-symmetrically and provided on the opposite vehicle side.

From the cross section A-A according to FIG. 13, which passes through the front support elements 128, it is evident that an axle connecting element 38 provided on the axle arrangement 154 in the bearing position against the connecting portion 126 is fastened to the reinforcing element 120 with the axle fastening element 40. Here, the axle fastening element 40 is in engagement with a fastener 11 provided on the additional reinforcing element 130 or on its base portion 146. Clearly visible in FIG. 13 is that the axle connecting element 38 extends into the trough-like depression 136 of the reinforcing element 120.

The comparatively deep or highly stamped configuration of the trough-like depression 136 causes a comparatively large spacing between the connecting portion 126 and the lower shell 158a of the side member. However, in order to be able to nevertheless use standardized axle fastening elements 40 and in order to be able to increase the structural stiffness of the reinforcing element 120 further, the additional reinforcing element 130 is inserted between the reinforcing element 120 and the side member 7. The fastening elements 11 otherwise provided on the side member 7, 158a can be relocated further downwards via the additional reinforcing element 130, so that the entire intermediate space between the side member 7 or its lower sheet metal shell 158a does not have to be bridged with an excessively long axle fastening element 40 that has to be provided separately.

Figure 14:
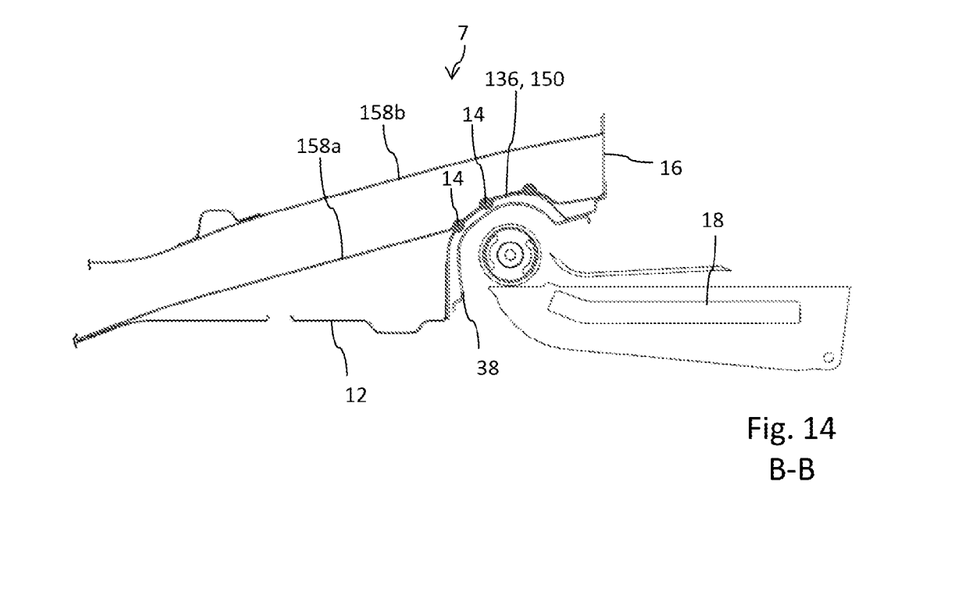
FIG. 14 is a cross section B-B according to FIG. 12.

In the cross-sectional representation B-B according to FIG. 14, it is shown furthermore that the trough-like depression 136 is connected to the trough-like depression 150 of the lower shell 158a of the side member 7 via a plurality of spot welds. It is evident, furthermore, in FIG. 14 that the axle connecting element 38 of the multi-link axle arrangement 154 can be mounted by the trough-like depression 136 of the reinforcing element 120. If with this axle connection no reinforcing element 120 to be provided on the lower side of the side member 7 were to be attached, the entire lower shell 158a of the side member 7 would have to be formed in a correspondingly shaped way which would be accompanied by an increase in weight compared with the present solution.

Viewing FIG. 10 to FIG. 12 and FIG. 14 together, it is evident that an end portion of the reinforcing element 120 projecting in travelling direction towards the front and downwards and provided with the additional reinforcing element 130 supports itself horizontally on the side member 7 via the mounting plate 12. The mounting plate 12, the side member 7 as well as the reinforcing element 120 projecting from the side member 7 towards the bottom in this case form a structurally reinforcing triangle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle body, comprising:
   a reinforcing element;
   a rear axle arrangement;
   a one rear-end side member comprising a rear-end side member portion forming a first half shell and a cover portion forming a second half shell, the rear-end side member portion mating with the cover portion such that the first and second half shells form a generally closed side member profile, and
   wherein the reinforcing element is arranged on an underside of the rear-end side member portion for a connection of the rear axle arrangement,
   wherein the reinforcing element comprises:
      a connecting portion spaced from the underside of the rear-end side member portion with a through-opening for mounting an axle fastening element, and
   wherein the connecting portion supports itself on the underside of the rear-end side member portion with a support element penetrating an intermediate space between the underside of the rear-end side member portion and the connecting portion.

2. The motor vehicle body according to claim 1, wherein the support element is a sleeve enclosing the through-opening.

3. The motor vehicle body according to claim 1, wherein the support element is unitarily formed with the connecting portion.

4. The motor vehicle body according to claim 1, wherein the support element is formed as a stamping of the connecting portion.

5. The motor vehicle body according to claim 1, wherein the support element is arranged on the connecting portion as a separate component.

6. The motor vehicle body according to claim 1, further comprising a fastening element on the rear-end side member portion that substantially comes to lie aligned with the through-opening of the reinforcing element.

7. The motor vehicle body according to claim 1, wherein the support element on an end facing away from the connecting portion comprises a support flange.

8. The motor vehicle body according to claim 1, wherein the connecting portion comprises a trough-like depression that extends towards the rear-end side member portion for mounting an axle bearing.

9. The motor vehicle body according to claim 8, wherein the trough-like depression directly comes to bear against the rear-end side member portion in a supporting manner.

10. The motor vehicle body according to claim 8, wherein the rear-end side member portion in a connecting region of the reinforcing element is formed substantially free of kinks.

11. The motor vehicle body according to claim 10, wherein the rear-end side member portion in the connecting region of the reinforcing element comprises an indentation corresponding to the trough-like depression of the reinforcing element.

12. The motor vehicle body according to claim 8, wherein the reinforcing element via the trough-like depression is structurally connected to the rear-end side member portion.

13. The motor vehicle body according to claim 1, wherein the reinforcing element with a marginal flange portion supports itself on the rear-end side member portion.

14. The motor vehicle body according to claim 1, wherein an additional reinforcing element is arranged between the reinforcing element and the rear-end side member portion, which supports itself on a support element of the reinforcing element.

15. The motor vehicle body according to claim 1, wherein the reinforcing element with a marginal flange portion supports itself on a further support structure component of the motor vehicle body.

* * * * *